No. 761,401. PATENTED MAY 31, 1904.
G. H. REYNOLDS.
ROPE DRIVE APPARATUS.
APPLICATION FILED JULY 31, 1903.
NO MODEL. 3 SHEETS—SHEET 1.

WITNESSES:
Henry E. Kirby
George H. Dionysius

INVENTOR
George H. Reynolds
BY
E. W. Marshall
ATTORNEY

No. 761,401. PATENTED MAY 31, 1904.
G. H. REYNOLDS.
ROPE DRIVE APPARATUS.
APPLICATION FILED JULY 31, 1903.
NO MODEL. 3 SHEETS—SHEET 2.
Fig. 6,
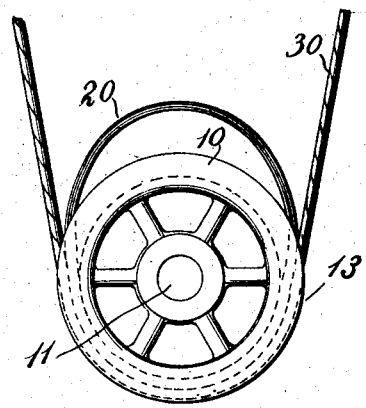
Fig. 7
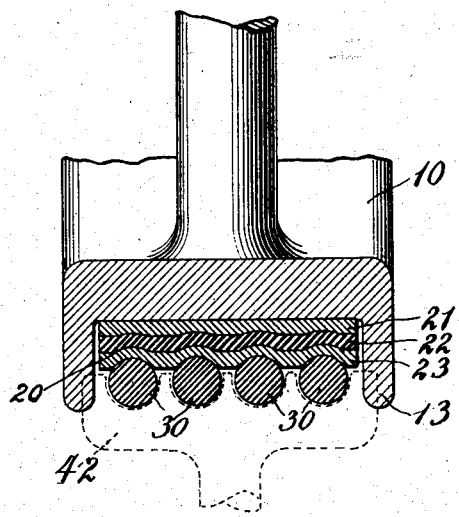
WITNESSES: INVENTOR
Henry E. Kirby George H. Reynolds
George H. Dionysius BY
E. W. Marshall
ATTORNEY No. 761,401. PATENTED MAY 31, 1904.
G. H. REYNOLDS.
ROPE DRIVE APPARATUS.
APPLICATION FILED JULY 31, 1903.
NO MODEL. 3 SHEETS—SHEET 3.

WITNESSES:
Henry E. Kirby
George H. Dionysius

INVENTOR
George H. Reynolds
BY
E. W. Marshall
ATTORNEY

No. 761,401. Patented May 31, 1904.

UNITED STATES PATENT OFFICE.

GEORGE H. REYNOLDS, OF MANSFIELD DEPOT, CONNECTICUT, ASSIGNOR TO OTIS ELEVATOR COMPANY, OF EAST ORANGE, NEW JERSEY, A CORPORATION OF NEW JERSEY.

ROPE-DRIVE APPARATUS.

SPECIFICATION forming part of Letters Patent No. 761,401, dated May 31, 1904.

Application filed July 31, 1903. Serial No. 167,760. (No model.)

*To all whom it may concern:*

Be it known that I, GEORGE H. REYNOLDS, a citizen of the United States, and a resident of Mansfield Depot, Tolland county, Connecticut, have invented certain new and useful Improvements in Rope-Drive Apparatus, of which the following is a specification.

The invention relates to driving ropes for the transmission of power or for similar purposes; and its object is to provide a simple and efficient means for accomplishing this purpose.

In the various systems of rope-driving mechanisms now in use it is difficult to obtain sufficient friction between the rope and its driving-sheave without an abnormal tension on the rope. The consequent slipping and undue strain upon the driven ropes cause them to wear rapidly, so that they have to be replaced frequently and often at great expense. This invention eliminates the difficulties and provides an apparatus of great efficiency. The driving friction is increased, there is no slipping of the ropes, and consequently the tension on the ropes may be less, and the life of the ropes is longer.

My system of rope-drive is applicable to any of the systems now in use whereby a driven rope is used as a medium of transmitting power, as in cableways, hoists, or in driving-shafting.

Figure 4:
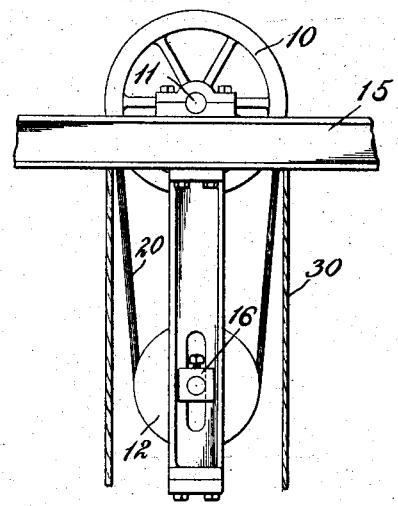
Figure 5:
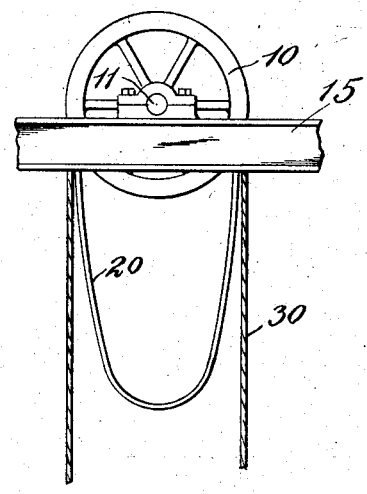
Figure 1:
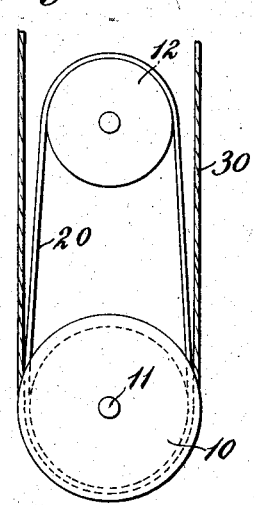
Figure 2:
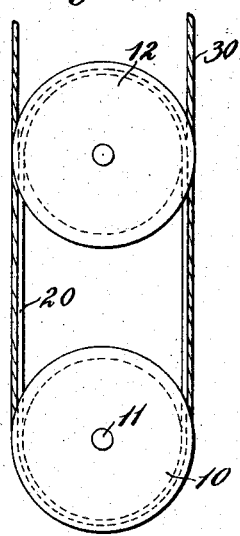
Figure 3:
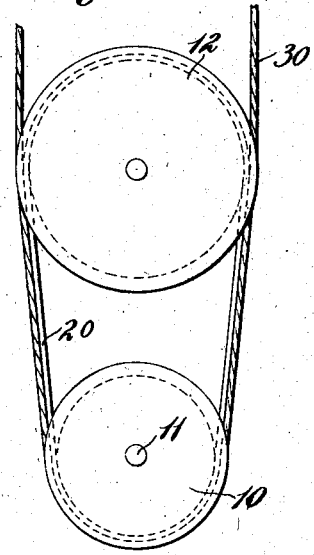
Figure 8:
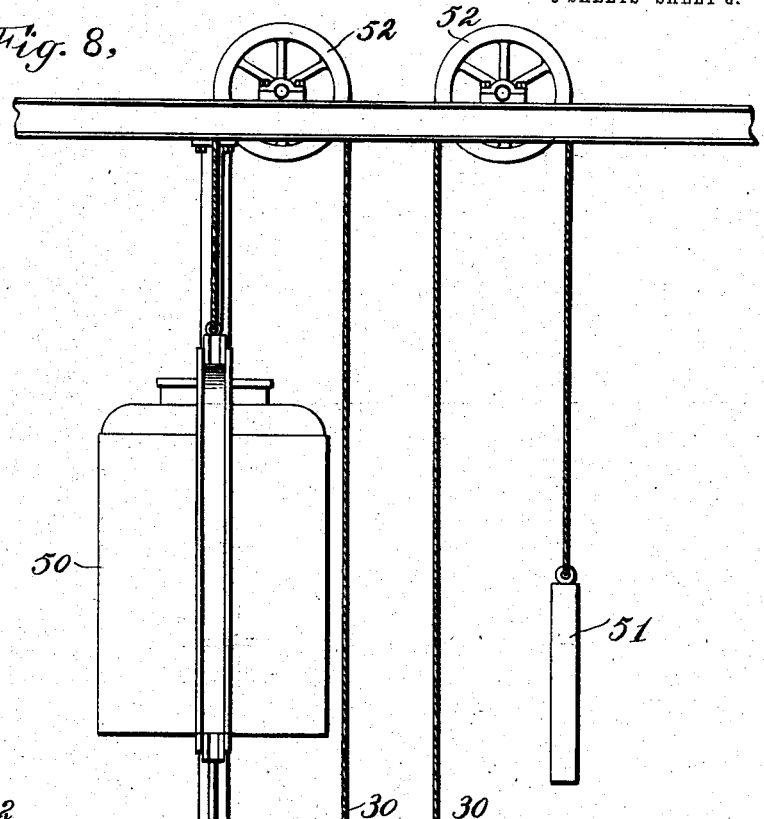
Figure 9:
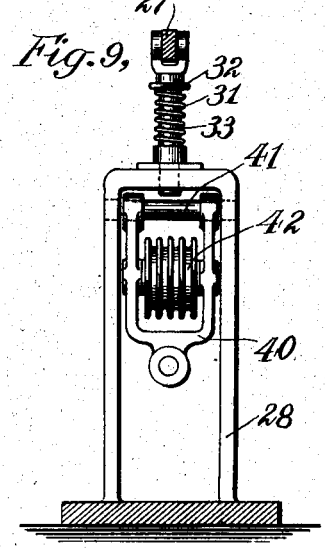

In the accompanying drawings, Figures 1, 2, and 3 represent diagrammatically my invention. Figs. 4, 5, and 6 are modifications of the same. Fig. 7 is a sectional view of certain parts of apparatus embodying my invention and showing certain parts more in detail. Fig. 8 represents my invention applied to an elevator. Fig. 9 is an elevation, partly in section, of certain details of apparatus used in conjunction with my invention.

Similar figures of reference indicate corresponding parts in the different views.

Referring now to Fig. 1, 10 represents a driving-sheave suitably connected to a shaft 11. This shaft 11 is connected to some source of power—as, for example, an electric motor. In some cases it may be the driven shaft. Around this sheave I place a belt 20, of leather or other suitable material, and provide an idler-sheave 12 to guide this belt. These sheaves may be held apart by an arrangement of springs, if desired. Over this belt I run one or more transmission-ropes 30. In this case I have shown the guide-sheave 12 of smaller diameter than the driving-sheave 10, so that the ropes 30 come in contact with the belt only around one-half or more of the diameter of the sheave 10.

In Fig. 2 I have shown the guide-sheave 12 of the same diameter as that of the driving-sheave 10, so that in this case the ropes are in contact with the belt all of its length except the part passing over the sheave 12. In some cases I find it desirable to have the belt spread the ropes apart and then use the arrangement shown in Fig. 3, wherein the guide-sheave 12 is of larger diameter than that of the driving-sheave 10. In some cases it is desirable to have the driving-sheaves supported overhead with the transmission-ropes leading downward. If so, the arrangement shown in Fig. 4 may be used. In this case the shaft 11 is suitably supported on beams 15 and the guide-sheave 12 is arranged with sliding bearings 16, so that its weight hangs in the belt and tends to cause the latter to run straight. This sheave 12 may be dispensed with entirely, if desired, and Fig. 5 shows such an arrangement.

Fig. 6 shows an arrangement where no guide-sheave is used and where the transmission-ropes 30 are led upward. In this case I prefer to use a shorter belt than that used in the other cases and to provide a wide flange 13 on the driving-sheave 10. For convenience I make the belt 20 a little longer than the outside circumference of the flange 13.

Fig. 7 shows some of the parts more in detail. Here a part of the driving-sheave 10 is shown in section and of a preferred construction. The face of this sheave is made a little larger than the belt 20 and may be made slightly crowning for the purpose of making the belt run centrally. Any desired number of transmission-ropes may be used. In this case I have shown four. The flanges 13 may be provided on the sheave 10 for the purpose of guiding the belt and keeping the ropes 30 from running off the belt. 42 represents in dotted lines a spreader, the purpose of which will appear later.

Fig. 8 shows, in elevation with some parts in section, an elevator comprising my invention. 50 represents a car, and 51 a counterweight. The car and counterweight are connected together by the transmission-ropes 30, which pass over sheaves 52 52 and under and outside of the belt 20 on the driving-sheave 10. 17 represents a source of power, in this case an electric motor. Its shaft 11 is connected to the driving-sheave 10. 28 28 are supports for a yoke 27, which yoke supports the shaft 26 of the guide-sheave 12. This yoke may be a part of the frame and supports 28, if desired; but I prefer to provide for it a yielding support, which is more clearly shown in Fig. 9. The yoke 27 is connected to rods 33, which slide into the supports 28 and are pushed upward by means of spiral springs 31, bearing on collars 32, attached to the rods and on the supports 28.

The construction of the spreader is shown in Figs. 8 and 9. It is made in the form of a grooved pulley supported in a frame 40, which is pivoted at 41. In Fig. 8 I have shown means for removing the spreaders from contact with the ropes 30, which consist of a screw 43, threaded into the frame 40, and a wheel or handle 44 for turning the screw. While this is a preferred construction of the spreader, other forms may be used to advantage—as, for instance, a comb with its teeth set to guide the ropes.

The belt 20 may be of any suitable material. I prefer to make it three ply, as shown in Fig. 7 at 21, 22, and 23. Each layer may be of leather; but I prefer to make the outside layers 21 and 23 of leather and the inside layer 22 of a more resilient material, such as rubber or other suitable material. The purpose of this construction is to allow the belt to compensate in itself for the stretch on the outside and the compression on the inside due to the difference in perimeter between the inside and outside layers of a thick belt.

In the operation of this device it will be seen that the driving friction which the sheave exerts comes on the belt, and consequently the tendency to slip is between the sheave and the belt. The advantages of this are obvious, for not only is the flat surface of the belt much better adapted to friction driving than the surface of the rope would be, but any possibe slipping would have but little wearing effect.

When the ropes 30 are first run on the belt, the spreader 42 may be used to guide the ropes into the proper places on the belt. After the ropes have been run awhile they seat themselves and indent grooves in the belt, which gives them a better hold on the belt and tends to keep them running in their proper places. After they have become seated the spreader may be removed. If desired, the grooves or indentations may be made in the outer surface of the belt before the ropes are placed thereon. Of course if this is done the use of the spreader may be omitted.

The bearing or touching surface between a rope and belt may be of any desired length and should be made of such length that there is no tendency of the rope to slip on the belt. The seats which the ropes have on the belt are more or less of a soft yielding character and so have little or no tendency to wear the ropes. This is in great contrast to the rapid wear of ropes which are driven directly by a sheave.

I have shown and described several modifications of this invention; but it is capable of many other changes, and therefore I do not wish to limit myself to those shown herein. It is also possible to use the rope 30 as the driver of sheave 10 with the belt 20 between them.

What I claim is—

1. In a rope-drive apparatus, the combination of a sheave, a rope and a loose belt interposed between said sheave and said rope, the rope in its operation forming an indentation in the belt and working therein.

2. In rope-drive apparatus the combination of a driving-sheave, a guide-sheave, a belt running over said sheaves, and a rope driven by said belt.

3. In rope-drive apparatus the combination of a driving-sheave, connected to a source of power, a guide-sheave, a belt running over said sheaves, means for keeping said sheaves apart and a rope running over and driven by said belt.

4. In rope-drive apparatus the combination of a driving-sheave, connected to a source of power, a guide-sheave, a belt running over said sheaves, means for keeping said sheaves apart, a plurality of ropes running over and driven by said belt and means for guiding said ropes onto the belt.

5. In rope-drive apparatus the combination with a sheave, of a loose belt running over the sheave said belt being composed of two layers of leather with a layer of resilient material between them, and a rope running over and driven by said belt.

6. In a rope-drive apparatus, the combination of a sheave, a rope and a loose belt interposed between said sheave and said rope, the belt having an indentation in its outer surface in which indentation the rope works.

In testimony whereof I have subscribed my name to this specification in the presence of two witnesses.

GEORGE H. REYNOLDS.

Witnesses:
HENRY E. KIRBY,
ERNEST W. MARSHALL.